July 22, 1969
C. G. THIEL
3,456,644
INHALATION-ACTUATED AEROSOL DISPENSING DEVICE
Filed Jan. 19, 1967
2 Sheets-Sheet 1
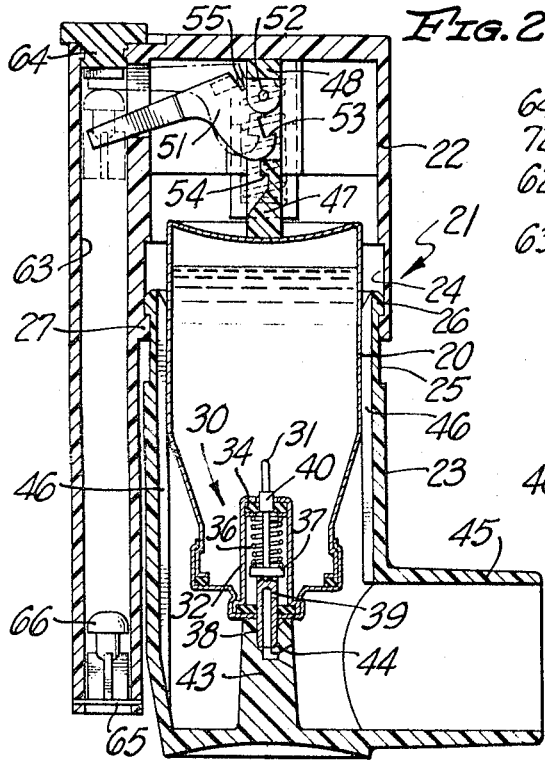
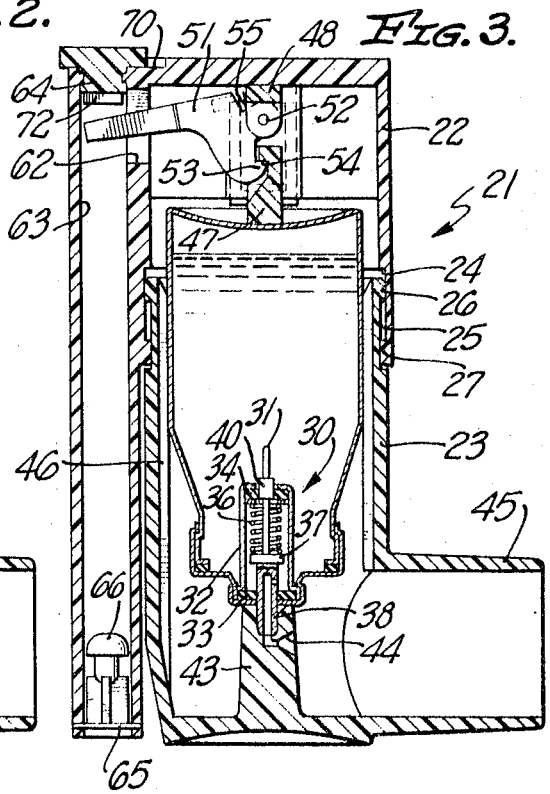
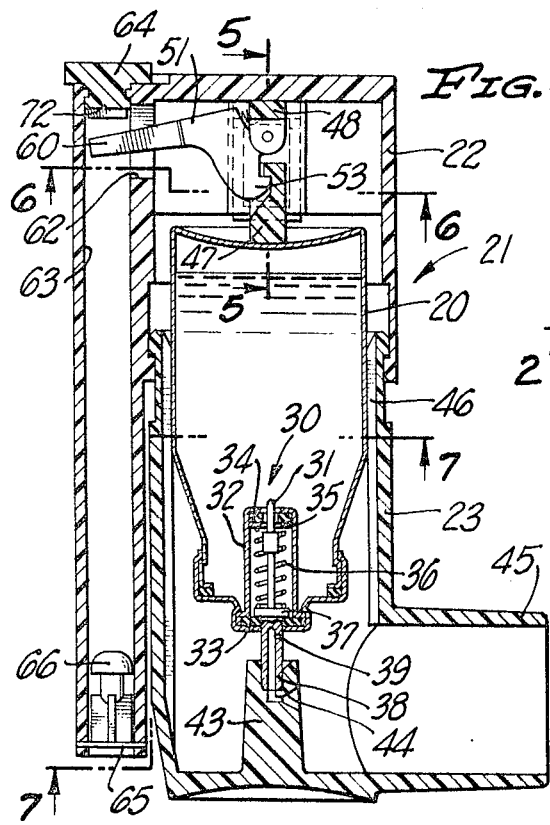
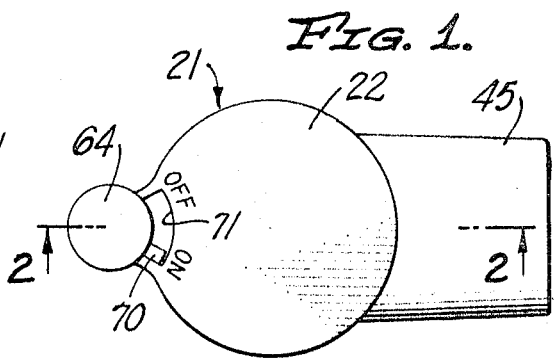
INVENTOR
CHARLES G. THIEL
BY HIS ATTORNEYS
HARRIS, KIECH, RUSSELL & KERN July 22, 1969      C. G. THIEL      3,456,644
INHALATION-ACTUATED AEROSOL DISPENSING DEVICE
Filed Jan. 19, 1967      2 Sheets-Sheet 2
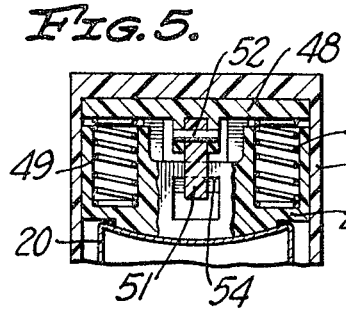
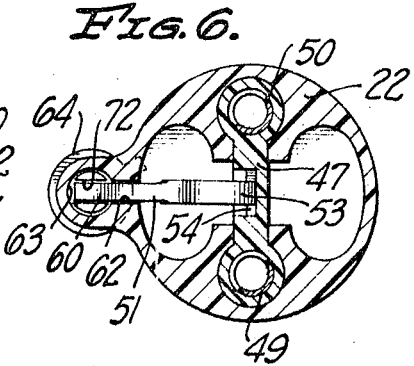
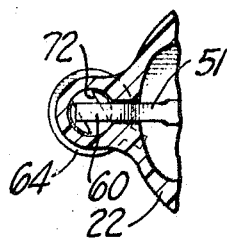
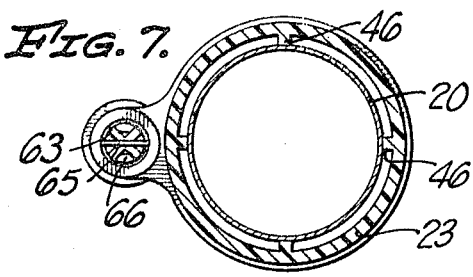
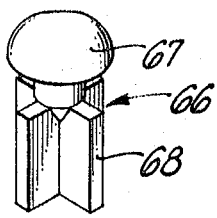
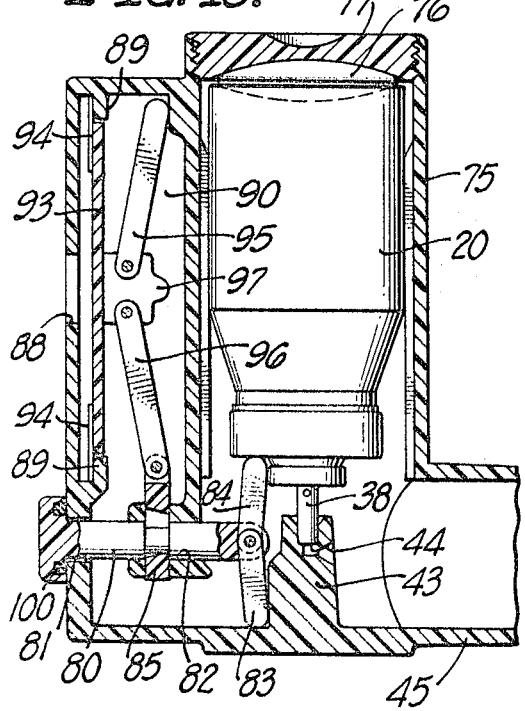
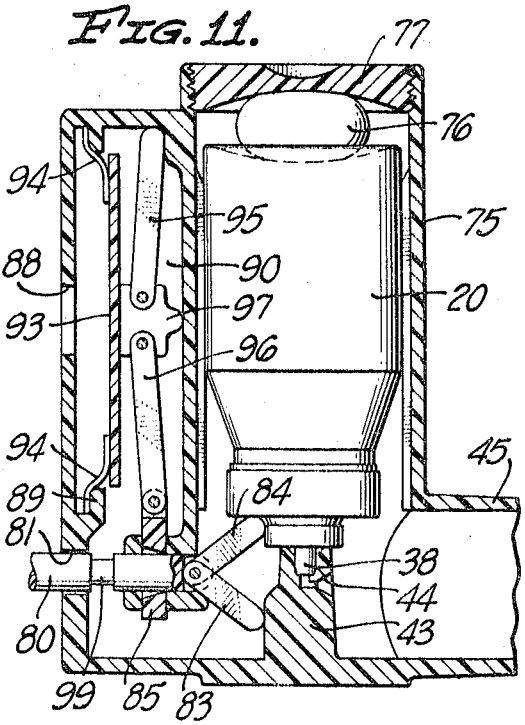
INVENTOR
CHARLES G. THIEL
BY HIS ATTORNEYS
HARRIS, KIECH, RUSSELL & KERN

United States Patent Office 3,456,644
Patented July 22, 1969

1

3,456,644
INHALATION-ACTUATED AEROSOL
DISPENSING DEVICE
Charles G. Thiel, Chatsworth, Calif., assignor to Dart
Industries Inc., Los Angeles, Calif., a corporation of
Delaware
Filed Jan. 19, 1967, Ser. No. 610,342
Int. Cl. A61m 11/00, 15/06, 15/00
U.S. Cl. 128—173                                    12 Claims

ABSTRACT OF THE DISCLOSURE

An aerosol dispensing device for discharging a metered amount of a medicament-containing aerosol into the mouth of a patient during inhalation. The device is manually actuated to a charging condition and is latched in this position. A breath actuated trigger releases the latch and discharges a dose into the patient's mouth.

---

This invention relates to a dispensing device which is particularly suited for dispensing and administering measured amounts of fluids. The principal use for devices of this type at the present time is in dispensing measured amounts of a medicament-containing aerosol for inhalation therapy.

A number of devices for administering medicament during inhalation have been described. In one form of such devices, the apparatus is manually actuated to a cocked position. During the cocking operation, a measured quantity of the material to be dispensed usually is metered into a metering chamber. The outlet of the device is then placed in the patient's mouth and the initiation of inhalation triggers the mechanism, dispensing the metered amount of material directly into the mouth. Dispensers of this general type are sometimes referred to as inhalation-timed dispensers or automatic dispensers. In another group of dispensers, the dispensing step is manually controlled by the patient. In yet another group of dispensers, the cocking operation is not utilized although the release is controlled by inhalation.

It is an object of the present invention to provide a new and improved mechanism for dispensers of the automatic type. A further object is to provide such new and improved dispensing devices having increased sensitivity permitting operation at lower pressure differentials and thereby providing better application of medicaments and improved operation for weak patients. A particular object of the invention is to provide such a dispensing device which is simple in construction, dependable in operation, and inexpensive to manufacture.

A variety of materials, particularly in the medical field, are being packaged and sold in aerosol containers, usually with a built-in metering valve. It is a particular object of the present invention to provide a new and improved dispensing device of the automatic type for use with such commercially available aerosol containers. A further object is to provide such a device in which the user can readily remove a used container and install a fresh container, with the operating mechanism of the device being reuseable an indefinite number of times.

It is an object of the invention to provide a dispensing device for use in combination with an aerosol dispensing container equipped with a metering valve movable between charging and discharging positions, the device including a housing for receiving the container for reciprocation of the container within the housing with the housing including a support member for receiving the discharge tube of the container and providing a discharge passage from the discharge tube. A further object is to provide such a dispensing device including spring means

2 carried in the housing and engageable with the container for urging the container toward the support member and the valve means toward the discharging position, with the spring means being compressible to a cocked position permitting movement of the valve means to the charging position and movement of the container away from the support member, latch means for latching the spring means in the cocked position, and trigger means for tripping the latch means to release the spring means and to move the valve means to the discharging position.

A further object of the invention is to provide such a device including manually actuable means for compressing the spring means to the cocked position and pressure actuated means for tripping the latch means. An additional object is to provide new and improved mechanisms for performing the operations of the dispensing device. Another object is to provide a locking means for the mechanism for locking same in the cocked position, thereby preventing accidental discharge while having the dispensing device available for use at any time.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a top view of a preferred embodiment of the dispensing device of the invention;

FIG. 2 is a sectional view taken along the line 2—2 of FIG. 1 showing the device in the discharging position;

FIG. 3 is a view similar to that of FIG. 2 showing the device at the completion of the cocking operation;

FIG. 4 is a view similar to that of FIGS. 2 and 3 showing the device cocked and latched and ready for tripping;

FIG. 5 is a partial sectional view taken along the line 5—5 of FIG. 4;

FIG. 6 is a sectional view taken along the line 6—6 of FIG. 4;

FIG. 7 is a sectional view taken along the line 7—7 of FIG. 4;

FIG. 8 is a partial view similar to FIG. 6 showing the device in the locked or off position;

FIG. 9 is an isometric view of a preferred trigger means of the device of FIGS. 1–8;

FIG. 10 is a sectional view similar to that of FIG. 4 showing an alternative embodiment of the device in the cocked and latched position; and FIG. 11 is a view similar to FIG. 10 showing the device in the discharge position.

Referring to the device of FIGS. 1–9, a container 20 is positioned within a housing 21 consisting of an upper portion 22 slidably disposed over a lower portion 23. The housing portions may be made of plastic moldings, with at least one portion somewhat flexible, permitting the other portions to be pushed thereover to the position of FIG. 2. The two portions have interengaging grooves 24, 25 and shoulders 26, 27, permitting telescoping sliding between the positions of FIGS. 2 and 3.

The container 20 may be a conventional aerosol dispensing container such as is described in U.S. Patent No. 3,001,524. A metering valve 30 may be incorporated in the container 20 and includes a stem 31 movable between a charging position (FIG. 4) and a discharging position (FIG. 2). A tank 32 is fixed in the end of the container 20 with a gasket 33 at the container opening. Another gasket 34 and a plate 35 are positioned at the other end of the tank 32. A spring 36 is positioned about the stem 31 and is compressed between the plate 35 and a shoulder 37 of the stem. The stem 31 has a tubular outer end 38 with a lateral passage 39.

When the valve is in the charging position of FIG. 4, a measured quantity of fluid from the container 20 flows into the tank 32 around the reduced inner end of the stem 31. Engagement of the shoulder 37 with the gasket 33 prevents discharge from the container. For discharging, the spring 36 is compressed to the position of FIG. 2, bringing the shoulder 40 of the pin 31 into sealing engagement with the gasket 34 and at the same time, bringing the lateral opening 39 into the interior of the tank 32. The measured charge of material within the tank 32 is discharged through the tubular end 38 of the stem of the valve.

With the upper portion 22 of the housing removed, the container 20 is positioned in the lower portion 23, with the tubular end 38 of the valve stem entering a support member 43 projecting upward from the bottom of the housing. A discharge passage 44 is provided in the member 43 for communication between the valve and the mouth piece 45 of the housing. Ribs 46 may be provided within the lower portion 23 of the housing for spacing the container from the housing providing an air passage around the container. The container is preferably but not necessarily removable and replaceable.

A spring system is carried in the upper portion 22 of the housing for engaging the container 20 and urging the container downward to the discharging position of FIG. 2. The spring structure is best seen in FIGS. 5 and 6 and includes a moving element 47 and a fixed element 48 with springs 49, 50 carried in openings in the moving element 47 and engaging the fixed element 48. A latch level 51 is pivotally mounted in the fixed element 48 on a pin 52 and includes a hook 53 for engaging a notch 54 of the moving element 47 (FIG. 3). A small spring 55 disposed between the latch lever 51 and the fixed element 48 urges the lever toward the latching position.

An arm 60 of the latch lever 51 projects through an opening 62 of the housing into a tubular passage 63, the passage 63 preferably being molded as a part of the upper portion 22 of the housing (FIG. 4). The upper end of the passage 63 is closed by a plug 64 and a retainer wire 65 is positioned across the lower end of the passage. A trigger member 66 is positioned in the passage 63 and a preferred bullet-shaped form for the trigger member is shown in FIG. 9. A rounded head 67 substantially fills the passage 63 and vanes or fins 68 function to maintain the member oriented in the passage 63.

The plug 64 in the preferred embodiment is rotatable between an on or unlocking position and an off or locking position, with a finger 70 riding in an arcuate groove 71 in the upper housing portion 22 for limiting the rotation (FIG. 1). When in the on position, a notch 72 in the lower end of the plug 64 is aligned with the latch lever 51 (FIG. 6), permitting upward movement of the latch lever. When in the off position, the groove 72 is rotated to the position of FIG. 8 for limiting movement of the latch lever 51.

In considering the operation of the device, start with the mechanism in the position of FIG. 2 as it is immediately following the discharge of a metered amount of material from the container. The housing is manually compressed, as by placing the thumb at the bottom and the fingers at the top of the housing. The moving element 47 is moved to the position of FIG. 3, compressing the springs 49, 50 and the hook 53 of the latch lever engages the notch 54 of the moving element, cocking the spring system. The manual compression force is now released and the container is moved to the charging position of FIG. 4 with the spring 36 of the valve acting to move the container upward with respect to the lower portion 23 of the housing. The device is now cocked and latched and the metering valve is charged. If desired, the plug 64 may be moved to the off or locking position. When the patient is ready for a dose, the locking device is turned to the on position and the mouthpiece 45 is positioned in the patient's mouth.

There is an air passage through the device starting at the bottom of the tubular section 63, through the opening 62 into the upper portion 22 of the housing, around the container 20 to the lower portion of the housing and out through the mouthpiece 45. When the patient starts to inhale, a pressure differential is produced across the trigger member 66, causing the trigger member to fly upward and impact the arm 60 of the latch lever 51, as shown in phantom lines in FIG. 2. This impact trips the latch lever and releases the moving element 47. The compressed springs 49, 50 act through the moving element 47 to move the container 20 downward from the position of FIG. 4 to the position of FIG. 2, discharging the metered dose through the passage 44 into the mouthpiece 45 for inhalation by the patient, thereby completing the cycle of operation of the dispensing device.

An alternative form of the dispensing device is illustrated in FIGS. 10 and 11, with the container 20 carried in a one-piece housing 75 having the general configuration of the housing of the earlier embodiment. The container is inserted through the open top of the housing, with the tubular end 38 of the valve stem entering the support member 43. A spring member 76 is positioned over the container and a cover 77 is threadedly inserted into the top opening of the container. The spring member 76 typically may be a plastic balloon or an ovel metal spring.

A push rod 80 is slidably positioned in aligned openings 81, 82 of the housing. Levers 83, 84 are pivotally carried at the inner end of the push rod 80, with one lever engaging the container 20 and the other lever engaging the bottom of the housing and the support member 43. A latch plate 85 is disposed in the housing for sliding transverse to the axis of the push rod 80, between the latching position of FIG. 10 and the unlatched position of FIG. 11.

An air passage is provided through the device, starting at an opening 88, with a relatively short section of relatively large cross-sectional area formed by a shoulder 89, leading into a chamber 90, and around the support member 43 to the mouthpiece 45. A plate or vane 93 is supported in the passage formed by the shoulder 89 by resilient members 94. Levers 95, 96 are pivotally mounted on a boss 97 carried on the inner side of the vane 93, with the lever 95 engaging the housing and the lever 96 pivotally connected to the latch plate 85.

The dispensing device is shown in the discharging position in FIG. 11. After discharge, the push rod 80 is manually pushed inward from the position of FIG. 11 to the position of FIG. 10, with the action of the levers 83, 84 moving the container upward and compressing the spring 76. The reduced section 99 of the push rod is brought into alignment with the latch plate 85, permitting movement of the vane 93 to the position of FIG. 10 under the action of the resilient members 94. This movement of the vane produces an upward movement of the latch plate 85 to the position of FIG. 10, thereby latching the mechanism in the cocked position.

The dispensing device is now ready for dispensing a metered charge. The patient places the mouthpiece 45 in his mouth and starts to take a breath. The initial inhalation produces a pressure differential across the vane 93, moving the vane to the right to the position of FIG. 11, thereby triggering the latch so that the spring may move the container down to the discharging position and discharge the metered dose into the mouthpiece.

The vane 93 has a relatively large cross-sectional area and is required to travel only a very short distance in order to trigger the latch and in order to open the air passage. This arrangement provides a very sensitive device which is triggered with a very low pressure differential providing actuation at nearly the exact instant of commencement of inhalation while also inserting very little impedance into the air passage, the latter being of particular importance with weak patients. The boss 97 engages the housing as shown in FIG. 11, thereby limiting the travel of the vane 93 during the triggering operation. It is desirable to have an open air passage through the device after dispensing a charge so that continued inhalation by the patient will scavenge the aerosol from the passage 44 and mouthpiece 45 and so that the device will introduce a minimum impedance to normal breathing. In one arrangement air flow may occur around the vane 93 when in the position of FIG. 11. In another arrangement, the push rod 80 may be a loose fit in the opening 81 permitting free air flow therethrough except when the mechanism is in the latched position with sealing ring 100 engaging the housing 75 around the opening 81. Of course, both arrangements may be used at one time if desired.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a dispensing device in combination with an aerosol dispensing container equipped with a metering valve means movable between charging and discharging positions and having a discharge tube at one end thereof and charged with a self-propelling liquid composition, the improvement comprising:
   a housing receiving said container for reciprocation of said container within said housing,
   said housing including a support member having an opening receiving said discharge tube and providing a discharge passage for said tube;
   spring means carried in said housing for urging said container toward said support member and said valve means toward said discharging position, with said spring means being compressible to a cocked position permitting movement of said valve means to said charging position and movement of said container away from said support member;
   latch means for latching said spring means in said cocked position; and
   trigger means for tripping said latch means to release said spring means to move said valve means to said discharging position.

2. A device as defined in claim 1 in which said spring means is positioned at the end of said container opposite said tube and including manually actuable means for applying a force to said container adjacent said one end for compressing said spring means to said cocked position.

3. A device as defined in claim 2 in which said manually actuable means includes first and second portions of said housing movable relative to each other, with said support member in said first portion and said spring means in said second portion.

4. A device as defined in claim 2 in which said manually actuable means includes lever means engaging said container and a push rod engaging said lever means and projecting exteriorly of said housing.

5. A device as defined in claim 1 including manually actuable means for compressing said spring means to said cocked position, and with said latch means incorporating bias means urging the latch means to the latching position.

6. A device as defined in claim 5 in which said housing includes means defining an air passage therethrough, and said trigger means includes an element disposed in said air passage and movable therein to engage and trip said latch means, with a pressure differential in said air passage across said element producing such movement.

7. A device as defined in claim 6 in which said air passage includes a tubular section, with said latch means extending into said tubular section adjacent one end thereof, and in which said movable element comprises a bullet-like unit slidable in said tubular section to impact said latch means under the influence of a pressure differential.

8. A device as defined in claim 6 in which said air passage includes a relatively short section of relatively large cross-sectional area, and in which said movable element comprises a vane-like unit disposed in and substantially blocking said short section of said air passage, with a pressure differential moving said element to trip said latch means.

9. A device as defined in claim 1 including locking means movable between locked and unlocked positions when said latch means is latching said spring means in said cocked position, with said locking means disposed when in said locked position to engage said latch means blocking tripping thereof.

10. In a dispensing device, the combination of:
    a housing including an aerosol dispensing container charged with a self-propelling liquid composition;
    metering valve means coupled to said container and movable between a charging position for receiving a charge from said container and a discharging position for dispensing said charge;
    spring means carried in said housing for urging said valve means to said discharging position;
    said housing including manually actuable means for compressing said spring means to a cocked position for movement of said valve means to said charging position;
    latch means for latching said spring means in said cocked position; and
    trigger means for tripping said latch means to release said spring means driving said valve means to said discharging position.

11. In a dispensing device, the combination of:
    a housing;
    an aerosol dispensing container carried in said housing and charged with a self-propelling liquid composition;
    metering valve means coupled to said container and movable between a charging position for receiving a charge from said container and a discharging position for dispensing said charge;
    said housing including first and second portions slidable relative to each other;
    spring means carried in said housing between said first portion and said container for urging said container against said second portion and said valve means to said discharging position, said first and second portions being manually compressible for compressing said spring means to a cocked position for movement of said valve means to said charging position;
    latch means for latching said spring means in said cocked position;
    said housing including means defining an air passage therethrough with a tubular section, with said latch means extending into said tubular section adjacent one end thereof; and
    a trip element slidably disposed in said tubular section to impact said latch means under influence of a pressure differential in said air passage for tripping said latch means to release said spring means driving said valve means to said discharging position.

12. In a dispensing device, the combination of:
    a housing;
    an aerosol dispensing container carried in said housing and charged with a self-propelling liquid composition;
    metering valve means coupled to said container and movable between a charging position for receiving a charge from said container and a discharging position for dispensing said charge;
    spring means carried in said housing for urging said container and valve means to said discharging position;
    a manually actuable push member carried in said housing and engaging said container for moving said container and compressing said spring means to a cocked position for movement of said valve means to said charging position;

latch means engaging said push member for latching said spring means in said cocked position;

said housing including means defining an air passage therethrough with a relatively short section of relatively large cross-sectional area; and a vane member disposed in and substantially blocking said short section of said air passage and coupled to said latch means, with a pressure differential in said air passage moving said vane member to trip said latch means and release said spring means driving said valve means to said discharging position.

References Cited

UNITED STATES PATENTS

| | | | |
|---|---|---|---|
| 2,992,645 | 7/1961 | Fowler | 128—266 XR |
| 3,001,524 | 9/1961 | Maison et al. | 128—208 XR |
| 3,187,748 | 6/1965 | Mitchell et al. | 128—173 |

RICHARD A. GAUDET, Primary Examiner

MARTIN F. MAJESTIC, Assistant Examiner

U.S. Cl. X.R.

128—208, 211